(Model.)
W. R. CAMPBELL & W. J. CHAMBERS.
CORN PLANTER CHECK ROWER.
No. 251,830. Patented Jan. 3, 1882.
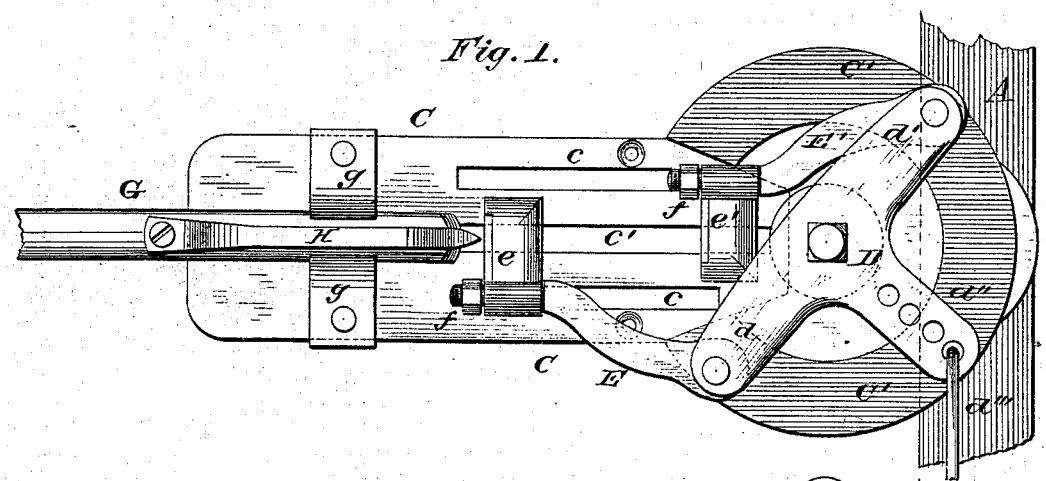
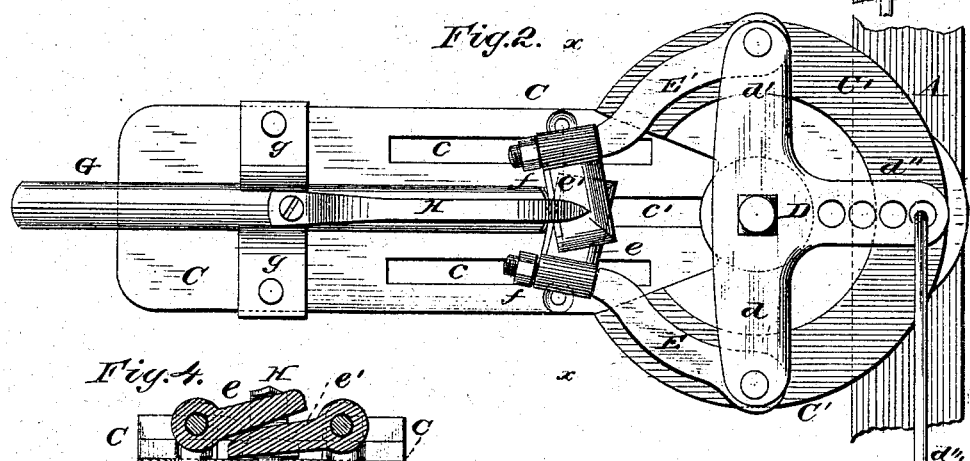
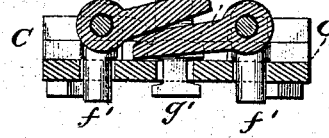
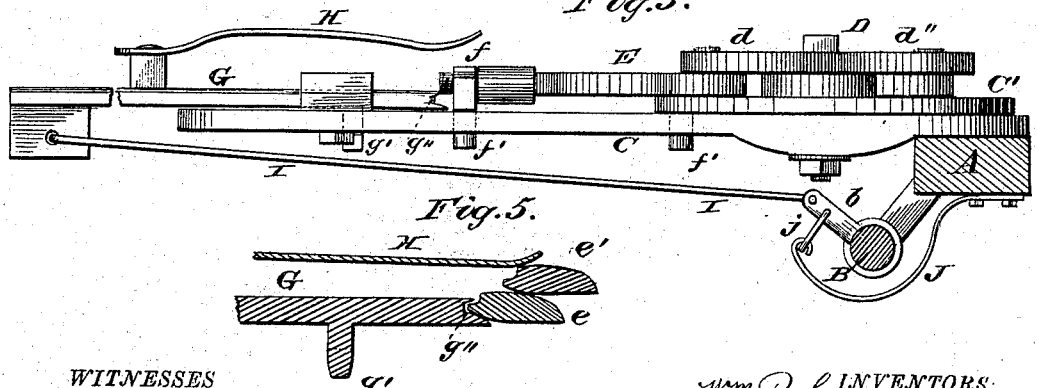
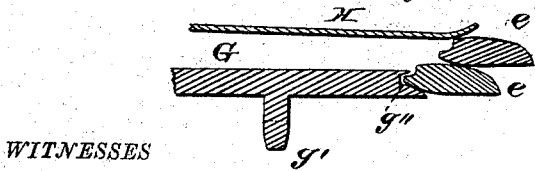
WITNESSES
Fred. G. Dieterich
P. C. Dieterich
INVENTORS
Wm. R. Campbell
Wm. J. Chambers
By W. B. Richards
Attorney

UNITED STATES PATENT OFFICE.

WILLIAM R. CAMPBELL AND WILLIAM J. CHAMBERS, OF WARREN COUNTY, ILLINOIS.

CORN-PLANTER CHECK-ROWER.

SPECIFICATION forming part of Letters Patent No. 251,830, dated January 3, 1882.

Application filed September 30, 1881. (Model.)

*To all whom it may concern:*

Be it known that we, WILLIAM R. CAMPBELL and WILLIAM J. CHAMBERS, citizens of the United States, residing in the county of Warren and State of Illinois, have invented certain new and useful Improvements in Corn-Planter Check-Rowers; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Our invention relates to check-rowers of that class which are actuated by a tappet-wire, or wire with knots upon it, stretched across the ground to be planted; and the invention consists in constructions and combinations hereinafter described, and set forth in the claims hereto annexed.

In the accompanying drawings, which illustrate our invention, and in which the same reference-letter indicates the same part in the different figures, Figure 1 is a top plan. Fig. 2 is a top plan, the parts shown in different relative positions from the positions shown at Fig. 1. Fig. 3 is a side elevation, partly in section. Fig. 4 is a sectional elevation in the line $x$ $x$ in Fig. 2. Fig. 5 is a detail sectional elevation of the sliding tappet-bar and swinging lugs.

Referring to the drawings by letters, letter A represents the central part of the ordinary supporting-bar, which extends across the machine, and near the mid-length part of which our device shown in the drawings is located. The bar A has bearings for the ordinary rock-shaft, B, which also extends across the machine and has the ordinary forked lever on each end. The outer ends of the bar A and rock-shaft B and the forked levers are not shown, as they are well known to persons skilled in the art.

C is the base-plate, on which the working parts of our device are mounted. It has three slots, $c$ $c$ $c'$, lengthwise of itself, and an enlarged circular end, $C'$.

D is a vibrating or oscillating head with three arms, $d$ $d'$ $d''$. The arm $d''$ has a series of holes, from either of which a rod, $d'''$, extends to the slide-bar which operates the seed-slides of the planter. (Not shown.) To each arm $d$ $d'$ an arm, E E', respectively, is hinged or journaled. To the free ends of the arms E E' are respectively hinged or journaled lugs $e$ $e'$, which extend inwardly and are located so that they may move in the same path. Nuts $f$ on the arms E E' hold the lugs $e$ $e'$, respectively, and permit them to swing in vertical planes transversely of the plate C. The nuts $f$ have lugs $f'$ on their lower sides, which extend downward through the slots $c$, and thus cause the ends of the arms E E' and lugs $e$ $e'$ to slide in straight paths as they are reciprocated to oscillate the three-armed plate D.

G is a tappet rod or bar, which slides lengthwise in ways $g$ $g$, which are fixed to the plate C, and is further guided and held in line by a lug, $g'$, which extends downward through the slot $c'$. The forward end of the tappet-bar G has a notch, $g''$, into which the side of each lug $e$ $e'$ is received to hold the lug from rising while in contact with the tappet-arm, as shown plainly at Fig. 5.

H is an arm secured at one end somewhat above and to the arm G, as shown at Fig. 3, and acts as a guard when one of the lugs $e$ or $e'$ is rising over the other, to prevent it swinging upward too much.

I is a connecting-rod extending from the outer end of the bar G to an arm, $b$, which projects from the rock-shaft B.

J is a spring connected to the bar A at one end, and by a link, $j$, at its other end to the arm $b$, and is adapted to retract or return the shaft B to its original position, in the ordinary manner, after it is oscillated in one direction by the action of the tappet-wire on the forked lever.

In operation, when each tappet on the stretched wire acts on the rock-shaft, it will draw back the arm $b$, and the rod I will give a forward motion to the tappet-arm G. As shown at Fig. 1, the tappet-arm G will strike the lug $e$ and force it forward, and thereby give a throw or oscillation to the head D and a throw to the corn-planter seed-slides. As the lug $e$ passes forward the lug $e'$ will be forced backward, and the forward side of each lug being beveled from above, and its rear side beveled slightly from below, the lug $e'$ will be raised by the lug $e$ or swung upward, so that the lug $e$ passes beneath it, as shown at Figs. 4 and 5. The tappet-arm G is then retracted by the action of the spring J on the rock-shaft B, and at its next forward motion it acts upon the lug $e'$ in the same manner and with the same results as hereinbefore described of the lug $e$.

What we claim as new is—

1. In a corn-planter check-rower, in combination with the head D, with arms E E' hinged thereto, lugs $e\ e'$, hinged to the arms E E', whereby they may swing in vertical planes transversely to the arms E E' to pass each other, substantially as and for the purpose specified.

2. In combination with the head D, arms E E', and swinging lugs $e\ e'$, the lugs $f'$, which slide in the slots $c$ and guide the movements of the lugs $e\ e'$ in straight paths, substantially as and for the purpose specified.

3. In combination with the head D, arms E E', and swinging lugs $e\ e'$, the sliding tappet-arm G, adapted to impart movement alternately to the lugs $e\ e'$, substantially as and for the purpose specified.

4. In combination with the sliding tappet-arm G, swinging lugs $e\ e'$, and sliding arms E E', the guard H, adapted to limit the movement of the swinging lugs $e\ e'$, substantially as and for the purpose described.

5. In combination with the head D, arms E E', swinging lugs $e\ e'$, and tappet-arm G, the rock-shaft B and rod I, adapted to receive motion from the tappet-wire, substantially as and for the purpose specified.

In testimony whereof we affix our signatures in presence of two witnesses.

WILLIAM R. CAMPBELL.
WILLIAM J. CHAMBERS.

Witnesses:
JOSEPH EMITH,
S. WICKERSHAM.